US008557359B2

(12) United States Patent
Yang et al.

(10) Patent No.: US 8,557,359 B2
(45) Date of Patent: Oct. 15, 2013

(54) CLOSURE FOR CONTAINER (75) Inventors: Tahua Yang, Woodridge, IL (US); Keith Alan Haapala, Bristol, WI (US); Mark Allen Dewart, Lake Bluff, IL (US); Joseph Herbert Nogosek, Ashland, OH (US)

(73) Assignee: Abbott Laboratories, Abbott Park, IL (US)

( * ) Notice: Subject to any disclaimer, the term of this patent is extended or adjusted under 35 U.S.C. 154(b) by 1195 days.

(21) Appl. No.: 11/402,537

(22) Filed: Apr. 12, 2006

(65) Prior Publication Data

US 2007/0243348 A1    Oct. 18, 2007

(51) Int. Cl.
B65B 7/28    (2006.01)
B65D 35/44    (2006.01)
B65D 51/00    (2006.01)
B29D 22/00    (2006.01)

(52) U.S. Cl.
USPC ........ 428/36.91; 215/200; 215/211; 215/250; 215/259; 215/355

(58) Field of Classification Search
USPC ............ 604/415, 15, 279; 264/346; 128/912; 206/219; 214/247; 215/355, 364, 200, 215/211, 250, 259; 523/113; 525/240, 88; 428/474.4
See application file for complete search history.

(56) References Cited

U.S. PATENT DOCUMENTS

| 4,545,497 | A | | 10/1985 | Martha, Jr. |
| 5,269,763 | A | | 12/1993 | Boehmer et al. |
| 5,297,599 | A | * | 3/1994 | Bucheli ........................ 141/329 |
| 5,354,275 | A | | 10/1994 | Behnke et al. |
| 5,370,252 | A | | 12/1994 | Parsons et al. |
| 5,382,631 | A | | 1/1995 | Stehling et al. |
| 5,599,761 | A | | 2/1997 | Turner |
| 5,795,784 | A | | 8/1998 | Arnquist et al. |
| D397,938 | S | | 9/1998 | Graham et al. |
| 5,856,194 | A | | 1/1999 | Arnquist et al. |
| 5,861,463 | A | | 1/1999 | Sehanobish et al. |
| 6,005,053 | A | * | 12/1999 | Parikh et al. .................. 525/221 |
| 6,083,629 | A | * | 7/2000 | Kuroda et al. ............. 428/476.9 |
| 6,207,754 | B1 | * | 3/2001 | Yu .................. 525/133 |
| 6,372,848 | B1 | * | 4/2002 | Yang et al. .................... 525/191 |
| 6,461,696 | B1 | | 10/2002 | Ling et al. |
| 7,253,232 | B2 | * | 8/2007 | Pfaendner et al. ............. 525/69 |
| 2001/0007378 | A1 | | 7/2001 | Ewing et al. |
| 2002/0090476 | A1 | * | 7/2002 | Ling et al. .................. 428/36.91 |
| 2003/0143352 | A1 | | 7/2003 | Yang et al. |
| 2004/0127614 | A1 | * | 7/2004 | Jiang et al. .................... 524/270 |
| 2004/0249352 | A1 | * | 12/2004 | Swick ........................... 604/279 |

FOREIGN PATENT DOCUMENTS

WO     WO93/13143     8/1993

OTHER PUBLICATIONS

Encyclopedia of Polymer Science and Engineering, $2^{nd}$ edition, vol. 8, John Wiley & Sons, Inc., (1987), pp. 102-138.
Engage Polyolefin Elastomer Brochure, DuPont Dow Elastomers (2004).
Handbook of Thermoplastics, Edited by Olagoke Olabisi, Marcel Dekker, (1997), pp. 1-17.
PCT International Search Report, PCT/US07/66254, Dec. 12, 2007.

* cited by examiner

Primary Examiner — Ellen S Raudenbush
(74) Attorney, Agent, or Firm — Timothy P. Lucier (57) ABSTRACT A closure for a container, e.g., a container for holding reagents for an automated analyzer. The closure comprises a cap having an opening, the opening capable of communicating with the mouth of a container. The invention also provides an assembly comprising the closure of this invention and a container. The invention also provides a method for preparing the closure.

20 Claims, 8 Drawing Sheets

CLOSURE FOR CONTAINER

FIELD OF THE INVENTION

This invention relates to closures, and, more particularly, to closures for containers.

DISCUSSION OF THE ART

In the area of medical diagnostics, laboratory automation is increasingly employed to carry out a high volume of testing. Reagents used in automated diagnostic instruments are often required to be available for immediate use when biological samples are introduced to the diagnostic instrument. It is not practical for laboratory technicians to interrupt ongoing measurement processes and manually prepare reagents during a process scheduled to run for a long period of time. To improve accessibility of reagents, the containers containing the reagents need to be open at all times during the operation of the diagnostic instrument. However, the concentration of active ingredients of the reagents becomes uncontrollable on account of evaporation, if the containers of reagents remain open.

A variety of patents disclose closures for containers that address the evaporation problem. U.S. Pat. No. 5,269,763 discloses a cap for resealably sealing the end of a cannula to allow the insertion and removal of a tube or surgical instrument such as a needle into the cannula. The cap includes a valve body having a plurality of radially extending lip members arranged to form a pair of intersecting duckbill valves and a sleeve is provided for mounting the cap member to the end of a cannula. U.S. Pat. No. 5,370,252 discloses a cap adapted for cooperation with a container to provide a resealable enclosed space, the cap comprising an upper portion including an elongate member and a lower portion having a barrier or flap disposed on the lower portion to substantially prevent container contents contacting the elongate member when the cap is in a closed position, and to substantially reduce leakage of container contents when the cap is in an open or access position. U.S. Pat. No. D397,938 discloses a design for a cover for a container. U.S. Pat. No. 5,354,275 discloses an injection or sampling site adapted to receive a blunt cannula. The site includes a housing having an outside end with a passageway extending inwardly from the outside end, the passageway defining an axial direction; and an elastomeric septum closely received in the passageway of the housing. There is a slit extending through the septum generally in the axial direction which is formed by a hole through the septum that is flattened against itself to seal against itself when the septum is assembled in the housing. U.S. Pat. No. 4,545,497 discloses a disposable, one-piece cap for a liquid container including a frangible septum which allows easy penetration by a syringe needle to permit withdrawal of the liquid. The septum includes a plurality of grooves which are thinner than the thickness of the remainder of the septum to facilitate tearing of the septum as the needle penetrates. U.S. Pat. No. 5,297,599 discloses a closure or cap for a reagent container for use in an analysis system in which an automatic pipetting device is used for transferring small quantities of reagent from the reagent container to reaction cells. The closure is characterized in that it is formed in one piece from a plastic and it has a cylindrical side wall and an annular top wall adjacent the side wall and merging into a conical wall which extends inwards from the inner circle of the top wall and ends in a pierceable cap situated on the axis of symmetry of the cylindrical wall.

The prior art described above does not describe materials suitable for making closures for containers for reagents for use on automated instruments. Terms used to describe the desirable materials in these patents are rubbers and elastomers. Rubbers, such as polyisoprene, polybutylene, ethylene-propylene-diene-monomer (EPDM), silicones are thermosetting materials, which require crosslinking reactions to shape the materials. The consistency of products from batch to batch may vary greatly and is difficult to control on account of the variations in mixing ingredients and controlling the crosslinking reactions. The additives used in rubber compounding are prone to leach into the liquid carriers of medical reagents. The crosslinked rubber products cannot be reclaimed and generate a great deal of waste during manufacturing processes. It is desired to develop closures for containers of medical reagents, wherein the closures exhibit consistency, lack of impurities, and low cost.

SUMMARY OF THE INVENTION

In one aspect, this invention provides a closure for a container, e.g. a bottle for liquids, such as, for example, medical reagents in solutions. The closure has at least one slit to allow for the access of needles, cannulas, or tubes to aspirate the contents of the containers and control the degree of evaporation. In one embodiment, the closure comprises an ultra low-density polyethylene copolymer (ULDPE) or a blend of copolymers comprising at least one ultra low-density polyethylene copolymer (ULDPE). In a second aspect, the invention provides an assembly comprising the closure of this invention in combination with a container. In a third aspect, this invention provides a method for preparing the closure of this invention.

In one embodiment, the closure comprises an opening, the opening capable of communicating with the mouth of a container. In this embodiment of the closure of this invention, the closure is typically substantially cylindrical in shape and is characterized by having a circular base with a substantially cylindrical sidewall ascending from the base. The opening generally surrounds the major axis of the substantially cylindrical-shaped closure. The opening has dimensions of a size sufficient to accommodate an aspirating device for obtaining access to the contents of the container. The closure is typically made of at least one ULDPE copolymer.

The containers typically have a minimum fill volume of from about 25 mL to about 60 mL. It is preferred that the containers bearing the closures of this invention pass an evaporation qualification test. The container is typically made of a polymeric material, preferably a polyolefinic material, e.g., high-density polyethylene. The container can be fitted into a holder on a carousel or other type of storage medium. The contents of the container can be aspirated by the tip of a pipette.

A pipette can be used as the aspirating device to provide access to the contents of the container through the opening in the closure. The structure of the closure ensures that a vacuum will not be created. When the tip of the pipette penetrates the closure, the pipette and the tip thereof will not be damaged.

The closure of this invention provides numerous benefits. One major benefit is the facilitation of automation of testing operations. A second major benefit is the saving of time in obtaining access to the contents of a container, which also results in a reduction of costs associated with obtaining access to the contents of the container. A third major benefit is the allowing of a sampling device to open the closure without the sampling device being damaged by the opening process. A fourth major benefit is the ability to open the closure without adversely affecting the contents of the container. A fifth major benefit is the elimination of ethylene-propylene-diene-monomer (EPDM), which results in a significant reduction in cost.

The closure of this invention can be prepared by an injection molding method.

DETAILED DESCRIPTION

As used herein, the term "closure" means an article that closes and seals a container, e.g., a container for reagents for an automated analyzer. In one embodiment of the closure of this invention, the closure has threads formed in the interior wall thereof to enable the closure to be screwed onto the container. In other embodiments, the closure can be attached to the container by a friction fit, a snap fit, or some other type of fit. The term "copolymer" means a polymer formed when two or more different types of monomers are linked in the same polymer chain. This is in contrast to a homopolymer, where only one monomer is used. The expression "copolymer blend", "blend of copolymers", or the like, means a macroscopically homogeneous mixture of two or more different species of polymer. The expression "ultra low-density polyethylene copolymer" means a copolymer having ethylene monomeric units, wherein the copolymer has a density no greater than 0.915 g/cm$^3$. Sometimes an ultra low-density polyethylene copolymer is referred to as a very low-density polyethylene copolymer. The expression "m-ULDPE" means a copolymer obtained using a single-site catalyst, such as a metallocene catalyst, a vanadium catalyst, or the like. The expression "aspirating device" means a device for removing a liquid material, e.g., a reagent in liquid form, from a container.

Referring now to FIGS. 1, 2, 3, 4, 5, and 6, a closure 10 for a container 12 comprises a base 14 and a wall 16 ascending from the periphery of the base 14. An opening 18 is formed in the base 14. The opening 18 allows access of an aspirating device, e.g., the tip of a pipette, to the material "M" contained in the container 12.

In the embodiment shown in FIGS. 1, 2, 3, 4, 5, and 6, the closure 10 is a structure having a substantially cylindrical shape, in which the base 14 is substantially circular in shape and the wall 16 is substantially cylindrical in shape. In the embodiment shown in FIGS. 1, 2, 3, 4, 5, and 6, the cylindrical-shaped wall 16 has an interior surface 20 and an exterior surface 22. The interior surface 20 does not contact any other surface when the closure 10 is installed in the mouth 24 of the container 12. The exterior surface 22 comes into contact with the interior surface 26 of the neck 28 of the container 12 when the closure 10 is installed in the mouth 24 of the container 12. The exterior surface 22 of the substantially cylindrical-shaped wall 16 of the closure 10, i.e., the surface in contact with the interior surface 26 of the neck 28 of the container 12, does not comprise threads. In this embodiment, the substantially cylindrical-shaped wall 16 of the closure 10 can be constructed to fit into the mouth 24 of the container 12 by means of friction only between the exterior surface 22 of the closure 10 and the interior surface 26 of the neck 28 of the container. Alternatively, in another embodiment (not shown), the substantially cylindrical-shaped wall 16 of the closure 10 can be constructed to fit into the mouth 24 of the container 12 by means of a snap-fit ring formed on the interior surface 26 of the neck 28 of the container 12. In still another embodiment, the interior surface 26 of the neck 28 of the container 12 can be threaded. By means of these threads (not shown), the closure 10 can be screwed onto the threaded neck 28 of the container 12. It should be noted that the exterior surface 22 of the substantially cylindrical-shaped wall 16 of the closure 10 is not required to contain a snap-fit ring or threads.

Figure 1:
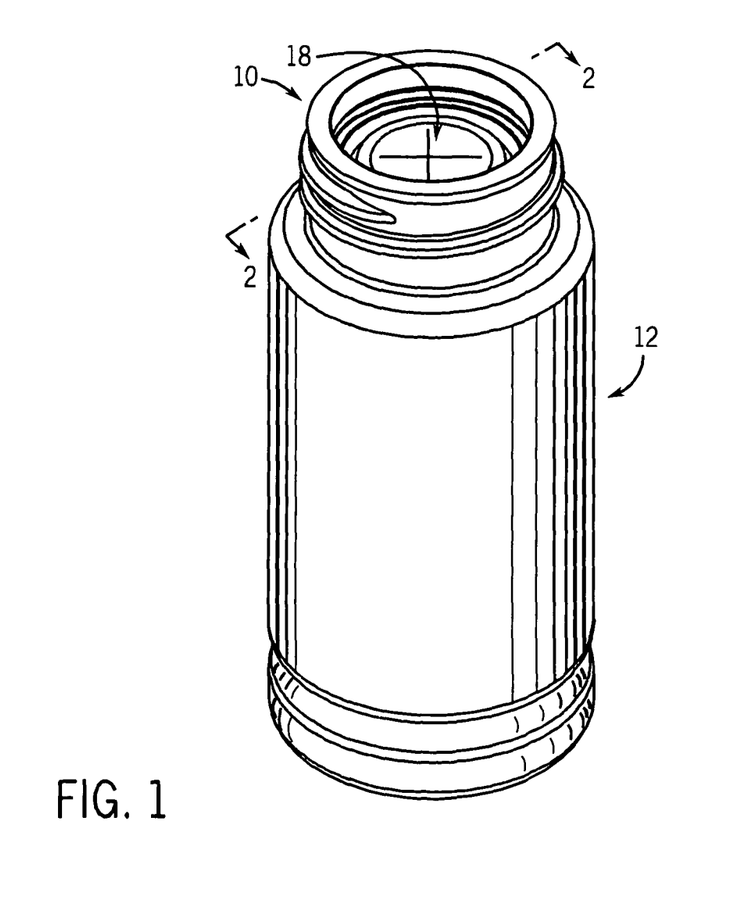
FIG. 1 is a perspective view of one embodiment of the closure of this invention attached to a container, e.g., a bottle for reagents.
Figure 2:
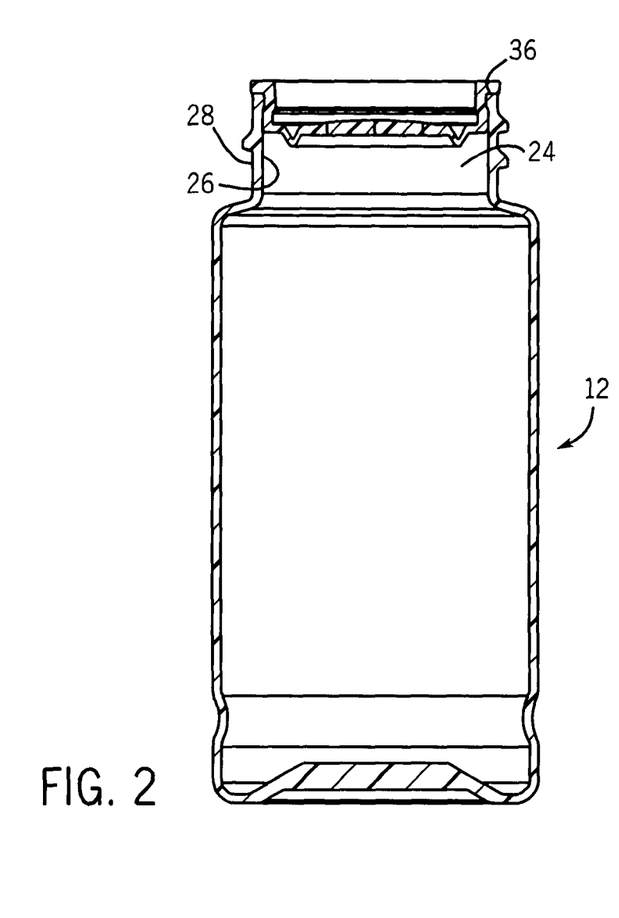
FIG. 2 is a side view in elevation of the closure of FIG. 1, attached to a container.

It should also be noted that the closure 10 need not be substantially cylindrical in shape. In other words, the particular shape of the closure 10 is not critical. However, the closure 10 must be of such a shape and construction that it can fit into the mouth of a container and maintain the closure 10 in the proper position. In general, the shape of the closure 10 should have the same shape as the shape of the mouth of the container. For example, if the mouth of the container has a substantially rectangular shape, the closure 10 should also have a substantially rectangular shape, and the closure 10 should be of such a size that it can fit into the mount of the container and be held in the mouth of the container snugly. As shown in FIGS. 1 and 2, neither the interior surface 20 nor the exterior surface 22 of the substantially cylindrical-shaped wall 16 of the closure 10 has a pattern. However, the interior surface 20 or the exterior surface 22 of the substantially cylindrical-shaped wall 16 of the closure 10 can have a pattern, if so desired.

In one embodiment of the closure of the invention, the opening 18 of the closure 10 comprises at least one slit 30a formed in the base 14 to allow for the penetration of aspirating devices, needles, cannulas, or tubes, to obtain access to the material "M" contained in the container 12. The at least one slit 30a needs to maintain a satisfactory seal to minimize loss of liquids from the container as a result of evaporation. The at least one slit 30a can have any of a variety of configurations. For example, the at least one slit 30a can be configured as a single linear cut through the base 14 of the closure 10, the single linear cut being either straight or having curvature. Alternatively, the at least one slit can be Y-shaped (not shown). As still another alternative, a plurality of slits 30a and 30b can be formed of two or more crossed linear cuts, the linear cuts intersecting at a single point 30c.

Figure 3:
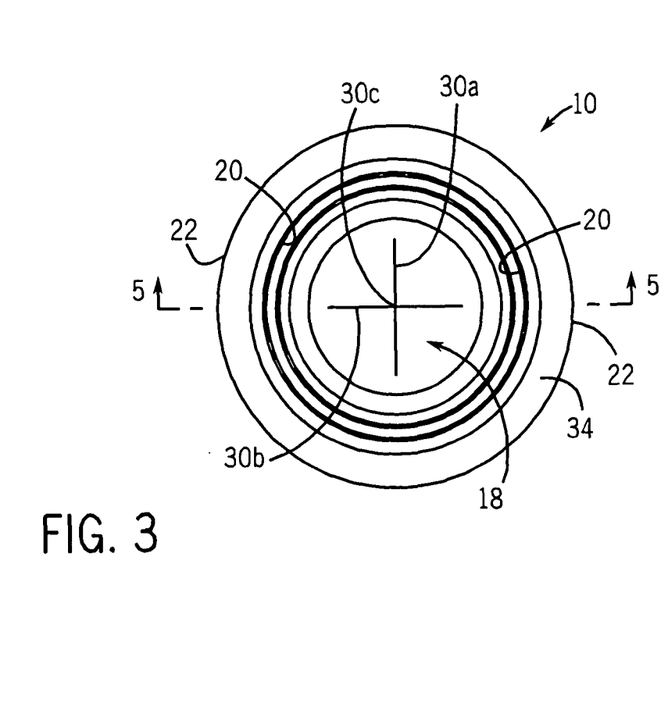
FIG. 3 is a top plan view of one embodiment of the closure of this invention.
Figure 4:
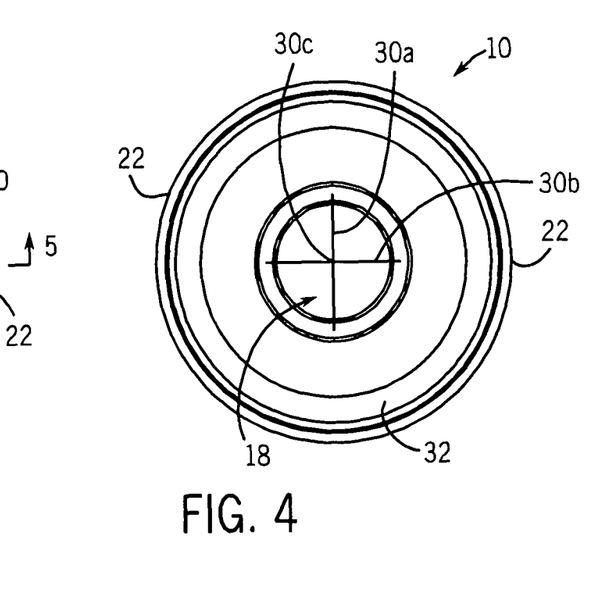
FIG. 4 is a bottom plan view of the embodiment of the closure of FIG. 3.

The slit 30a or slits 30a and 30b also function to reduce the likelihood of a vacuum forming upon penetration of the closure 10 by an aspirating device. As shown in FIGS. 3 and 4, the slits 30a and 30b extend radially from the center 30c of the closure 10. However, as mentioned earlier, other patterns of at least one slit, such as, for example, a single curved linear cut or a plurality of curved linear cuts, straight parallel linear cuts, zigzag cuts, other repeating patterns of cuts, irregular patterns of cuts (i.e., no pattern, random linear cuts), can also be employed. Typically, only a single slit need be employed, but a plurality of slits is preferred. Furthermore, slits having geometrical shapes, e.g., a cross, a star, or patterns similar to those employed for the at least one slit, can be employed.

Figure 5:
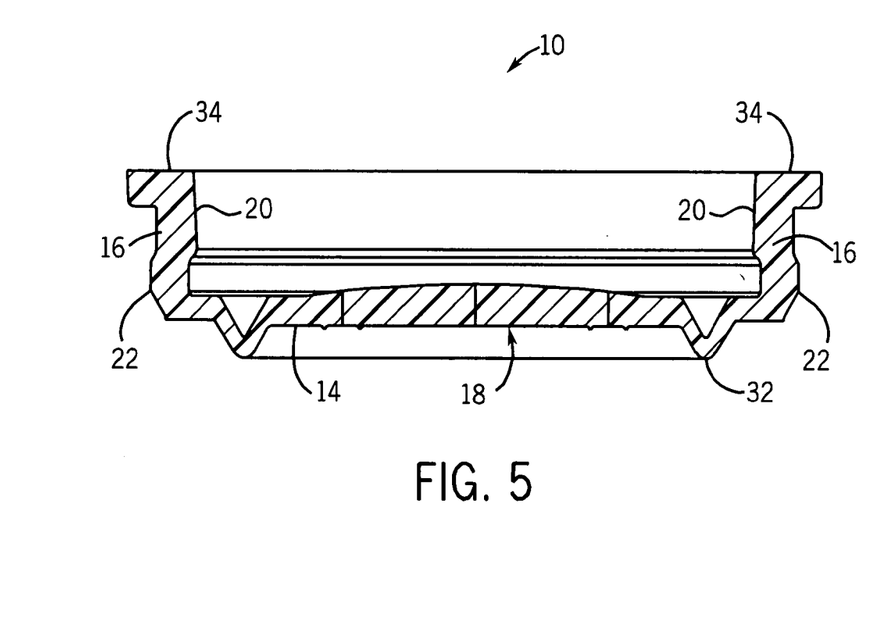
FIG. 5 is a cross-sectional view of the closure of FIGS. 3 and 4, taken along line 5-5.
Figure 6:
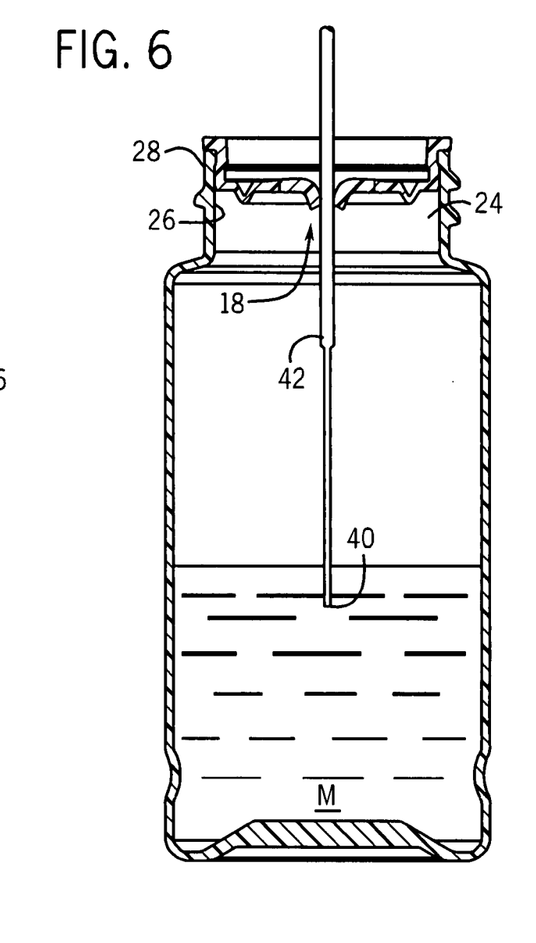
FIG. 6 is a view of the closure of FIG. 5, illustrating a sampling device, e.g., the tip of a pipette, inserted into the opening of the closure of FIG. 5.

In one embodiment, as shown in FIGS. 2, 5, and 6, the base 14 of the closure 10 is formed to include a ring 32. The ring 32 is positioned so that when the closure is installed on the container 12, the ring 32 faces the material "M" contained in the container 12. The function of the ring 32 is to urge the slits 30a and 30b to close when the aspiration device is retracted from the closure 10. The ring 32 is optional, that is, the closure 10 can be formed without having such a ring. As can be deduced from FIGS. 2, 5, 6, and 7A through 7E, inclusive, the ring can be formed by providing a molding unit having a mold cavity and a mold core that will operate in conjunction to form a ring in the desired configuration.

The closure 10 also has a flange 34 projecting from the cylindrical-shaped wall 16 of the closure 10. When the closure 10 is installed on the container 12, the flange 34 abuts the rim 36 of the container 12. The purpose of the flange 34 is to restrain the closure 10 from being forced downwardly into the mouth 24 of the container 12 when the aspirating device contacts the closure 10 during penetration of the aspirating device through the slits 30a and 30b of the closure 10. As shown in FIGS. 2, 5, and 6, the flange 34 is coextensive with the rim 36 of the container 12. This coextensive feature is not required; however, it is preferred that the flange 34 be of sufficient dimension to either be coextensive with the rim 36 of the container 12 or to extend beyond the rim 36 of the container 12, in order to ensure that the closure 10 not be inadvertently forced into the mouth of the container by an aspirating device. The frictional force between the exterior surface 22 of the closure 10 and the interior surface 26 of the neck 28 of the container 12 should be such that the removal of the aspirating device from the closure 10 does not dislodge the closure 10 from the container 12 when the aspirating device is removed from the container 12.

The particular thickness of the base 14 of the closure 10 and the particular thickness of the wall 16 of the closure 10 are not critical. However, the base 14 of the closure 10 and the wall 16 of the closure 10 must be of sufficient thickness to withstand the forces arising from the repeated introduction and repeated removal of aspirating devices through the opening 18 of the closure 10. If the thickness of either the base 14 or the thickness of the wall 16 or both is insufficient, the closure 10 will not remain intact for the duration of the expected runs, e.g., about 500 introductions and removals of the aspirating device.

While the dimensions of the closure 10 described herein are not critical, typical dimensions are being provided to illustrate the size of a typical closure. For use with a substantially cylindrical container having a nominal inside diameter of about 25.4 mm, a cylindrical closure 10 can have a nominal outside diameter of about 25.4 mm, a nominal inside diameter of about 22.8 mm, and a wall thickness of about 1.3 mm (thickness is equal to approximately one-half the difference between the outside diameter and the inside diameter). Regardless of the nominal outside diameter of the closure 10 and the nominal inside diameter of the container 12, the closure 10 and the container 12 should have dimensions such that when the container 12 is closed by the closure 10, evaporation of the sample from the container 12 is not excessive for the purpose intended. The nominal height of the wall 16 of the closure 10 can be about 6.4 mm. An aspirating device that can be used with the foregoing closure 10 can have a diameter of approximately 1.5 mm.

Copolymers suitable for preparing the closure of this invention can be prepared by polymerizing ethylene monomers with an α-olefin monomers typically having from 3 to 20 carbon atoms, inclusive, preferably having 3 to 10 carbon atoms, inclusive, and more preferably having from 4 to 8 carbon atoms, inclusive. The materials for making the closures can comprise blends of copolymers comprising a first copolymer having ethylene units and α-olefin units in an amount from about 1% to about 99% by weight of the blend and a second copolymer having ethylene units and α-olefin units present in an amount from about 1% to about 99% by weight of the blend. Preferably, the closure comprises only a single copolymer having ethylene units and α-olefin units for ease of processing and lower cost. Copolymers suitable for use in this invention are described, for example, in U.S. Pat. No. 6,372,848 and U.S. Pat. No. 5,382,631, both of which are incorporated herein by reference. According to these patents, copolymers having ethylene units α-olefin units can be prepared by using a single-site catalyst, such as, for example, a metallocene catalyst, a vanadium catalyst, or the like.

Commercially available copolymers suitable for making the closures of this invention include, but are not limited to, "AFFINITY" (Dow Chemical Company), "ENGAGE" (DuPont-Dow), and "EXACT" (ExxonMobil). These copolymers can be prepared according to the methods described in U.S. Pat. No. 6,372,848 and U.S. Pat. No. 5,382,631, both of which have been previously incorporated herein by reference. Product Grades of "ENGAGE" polyolefin elastomers suitable for use in this invention include, but are not limited to, ENR 7467, ENR 7447, ENR 7380, ENR 7270, ENR 7277, ENR 7256, ENR 7086, 8842, 8180, 8130, 8137, 8150/8157, 8100/8107, ENR 8556, 8200/8207, 8400/8407, 8452, 8411, 8003, 8401, 8440, 8480, 8450, 8402, 8540, 8445. According to U.S. Pat. No. 6,372,848, these copolymers are often referred to as m-ULDPE copolymers. The copolymers comprising ethylene units and α-olefin units typically have densities equal to or less than about 0.915 g/cm$^3$, preferably less than about 0.89 g/cm$^3$ (as measured by ASTM D-792). Polymers that can be used in blends with the aforementioned ultra low-density polyethylene copolymers include, but are not limited to, polypropylene polymers, copolymers of ethylene and lower alkyl acrylate, copolymers of ethylene and lower alkyl substituted alkyl acrylate, and ethylene vinyl acetate copolymers having a vinyl acetate content of from about 8% to about 40% by weight of the copolymer. The expression "lower alkyl acrylates" refers to comonomers having the formula set forth below:

where R represents an alkyl group having from 1 to 17 carbon atoms.

The expression "alkyl substituted alkyl acrylates" refers to comonomers having the formula set forth below:

where $R_1$ and $R_2$ represent alkyl groups having 1 to 17 carbon atoms and $R_1$ and $R_2$ can be same or different.

Polypropylene polymers suitable for use in preparing blends for preparing the closure of this invention include homopolymers of propylene, random copolymers of propylene, block copolymers of propylene, wherein the copolymers of propylene have a comonomer selected from α-olefins having from two to about 17 carbon atoms. Such propylene polymers are described, for example, in U.S. Pat. No. 6,743,523, incorporate herein by reference. Copolymers of ethylene and lower alkyl acrylate, copolymers of ethylene and lower alkyl substituted alkyl acrylate, and ethylene vinyl acetate copolymers having a vinyl acetate content of from about 8% to about 40% by weight of the copolymer are described, for example, in U.S. Patent Publication No. 2003/0143352, incorporated herein by reference.

Blends of copolymers suitable for preparing the closures of this invention typically have melt indexes of at least about 3 dg/min, preferably at least about 5 dg/min (as measured by ASTM D-1238). The Differential Scanning Calorimeter (DSC) melting peak at 10° C./min of the material of the closure is typically higher than about 60° C., preferably higher than about 70° C. The durometer of the material of the closure typically ranges from about 60 to about 100 Shore A, preferably from about 70 to about 90 Shore A (as measured by ASTM D-2240). The flexural modulus of the material of the closure is typically less than about 60 MPa, preferably less than about 40 MPa (as measured by ASTM D-790). If a single copolymer is used to prepare the closures of this invention, that single copolymer should have properties within the ranges described for the aforementioned blends of copolymers.

m-ULDPE copolymers release fewer leachable materials than do other elastomeric materials. m-ULDPE copolymers can be processed with conventional injection molding equipment, resulting in closures of lower cost, as compared with closures made from conventional compression molded elastomeric compounds. m-ULDPE elastomers possess the same elastic properties as do other rubbers, such as ethylene-propylene-diene-monomer (EPDM), silicone, polyisoprene (nature rubbers). m-ULDPE copolymers are thermoplastic elastomers, which can be recycled or reclaimed. Typical thermosetting rubbers cannot be reused. m-ULDPE copolymers are compounded easily and articles made from them are physically more consistent. Conventional rubbers require roll-mill compounding and heat curing. The rubber products always have much wider properties variation. m-ULDPE copolymers are thermally stable for most molding processes. Other high stress rubber processing requires various additives to stabilize the material. Rubbers are prone to degrade during high stress compounding and molding processes. m-ULDPE copolymers contain no PVC and phthalate plasticizers. m-ULDPE copolymers minimize pollution of the environment during waste incineration. The by-products of incineration do not contain nitric oxides and toxic dioxins.

OPERATION

Containers for reagents are typically furnished with threaded closures, as delivered by the manufacturer. After the container for a reagent is opened by removing the threaded closure, the threaded closure can be discarded. The closure 10 of this invention is inserted onto the rim 36 of the container 12 and is retained thereon by means of a friction fit between the exterior surface 22 of the closure 10 and the interior surface 26 of the neck 28 of the container 12. The flange 34 of the closure 10 is supported by the rim 36 of the container 12. Containers having the closure of this invention are placed at the designated location or locations of a diagnostic instrument for period of time based on specifications of the instrument. A diagnostic instrument contemplated for use with the closure 10 and container 12 of this described herein is the ARCHITECT® automated analyzer, described, for example, in U.S. Pat. Nos. 5,795,784 and 5,856,194, both of which are incorporated herein by reference. During the course of use, aspirating devices, which bear needles or other fluid transporting conduits, traverse the at least one slit 30a, 30b in the closure 10 to enable access to the liquid material "M" inside the container 12. When the aspirating device is retracted, the at least one slit 30a, 30b closes on account of the elastic nature of the material.

As shown in FIG. 6, the tip 40 of an aspirating device 42, e.g., a pipette, can successfully pass through the at least one slit 30a, 30b. Hanging drops are generally not observed on the tip after the tip is removed from the container. Such hanging drops are removed from the tip 40 of the aspirating device 42 by the edges of the at least one slit 30a, 30b of the closure 10.

Referring now to FIGS. 2 and 6, the closure 10 in FIG. 2 is shown as being closed, with no aspirating device entering through the opening 18. The closure 10 in FIG. 6 is shown with an aspirating device 42, e.g., the tip 40 of a pipette, positioned through the opening 18. The opening 18 of the closure 10 allows the aspirating device 42 to easily pass through the closure 10 to obtain access to the material "M" contained in the container 12; the opening 18 of the closure 10 also allows the aspirating device 42 to be easily withdrawn from the closure 10.

The sealed container preferably passes various commercially mandated tests, such as, for example, an evaporation qualification test and a seal dislodging force test, the criteria of which can be based on performance requirements typically encountered in an analytical laboratory. For example, the closure 10 is preferably able to control evaporation at an average rate of no greater than about 2% of 7 to 7.5 mL (100 test Microparticle fill) deionized water loss over 30 days, assuming evenly distributed usage when exposed to 12° C., 12% relative humidity, and 600 feet per minute air flow. The evaporation qualification test can be performed in the following manner:

1. A closed container containing 7 to 7.5 mL deionized water is weighed and recorded.
2. The original closure is removed and a closure described in this invention is installed on the container. The original closure is the closure that is supplied by the packager of the reagent.
3. The assembly of container and closure of this invention is placed in an automated instrument that allows insertion of a pipette and removal of a pipette through a slit in the closure.
4. Five hundred (500) cycles of insertions and removals of the pipette from the container are evenly programmed, over a run of 30 days.
5. The closure of this invention is removed and the original closure is re-installed on the container after run of 30 days.
6. The final weight of the assembly of original closure and container is determined.
7. The percent weight loss after the 30-day run is calculated the result compared with the specification.

The closure is preferably incapable of being dislodged from a reagent bottle when an aspirating device is inserted into or extracted from a bottle within 0.1-inch off center radial tolerance moving at a constant vertical velocity of from about 5 to about 20 inches per second. The forces created are preferably less than about 0.85 pound force vertical force. In addition, the closure 10 should not cause permanent damage to the aspirating device when penetrated by the tip of an aspirating device within 0.1-inch off-center radial tolerance (excluding outside diameter of the tip of the aspirating device).

The closure 10 is preferably compatible with the system in which it is used so that cross-contamination from one reagent container to another reagent container on account of the closure 10/aspiration device/wash system does not have a significant effect on the results of assays when the reagent is accessed up to the fill size of the reagent container, e.g., 100 or 500 times.

The closure 10 is preferably compatible with a system designed such that the aspiration device/closure 10/wash system does not dilute the reagent in the reagent container by more than 2% after the reagent container is accessed up to the number of times equal to the fill size of the container, e.g., 100 or 500 times.

The container 12 is capable of fitting into a sample rack and is capable of receiving tips of aspirating devices, e.g., pipettes. The neck 28 of the container 12 must be compatible with the closure 10 when the container 12 is closed by the closure 10 so that evaporation of the contents from the container 12 is not excessive for the purpose intended. For this reason, the container 12 is typically made of a resilient polymeric material, such as, for example, high-density polyethylene. The container 12 is typically of sufficient length to accommodate a standard vertical barcode label, which may be about two inches (5.08 mm) in length. The container 12 can be translucent or opaque. While the dimensions of a container 12 suitable for use with the closure described herein are not critical, typical dimensions are being provided to illustrate the specifications of a typical container. The length of the container typically does not exceed 88.9 mm. The outside diameter of the container typically does not exceed 28.6 mm. The inside diameter of the container typically does not exceed 31.2 mm. A representative example of the nominal dimensions of a container are 73.0 to 88.9 mm in length×28.0 mm outside diameter×25.4 mm inside diameter. Regardless of the dimensions of the container 12, the closure 10 and the container 12 should have dimensions such that when the container 12 is closed by the closure 10, evaporation of the sample from the container 12 is not excessive for the purpose intended.

The shape of the container 12 and the shape of the closure 10 are not critical. While the container 12 is shown as being cylindrical and having a circular mouth, the container 12 can have a mouth that circumscribes a polygon, such as, for example, a rectangle, a hexagon, an octagon, or the like. If the container 12 is substantially cylindrical in shape and has a substantially circular mouth, it is preferred that the closure 10 be substantially cylindrical in shape and have a substantially circular base. If the mouth of the container 12 is not circular, the closure 10 should have a shape that is compatible with, and preferably matching to, the shape of the mouth of the container 12. The shape of the container 12 is not critical. The container 12 need not be tubular in shape, but can be of any shape common to containers typically found in a laboratory that handles containers for reagents for automated analyzers. In the case of a substantially cylindrical-shaped container, the bottom of the container can be rounded, as shown in FIGS. 1, 2, and 5. In an alternative embodiment (not shown), the bottom of the container can be conical-shaped, or can even be of some other shape.

The closure 10 can be prepared by means of a molding process, typically an injection molding process. See, for example, *Encyclopedia of Polymer Science and Engineering*, 2nd Edition, Vol. 8, John Wiley & Sons, Inc. (1987), pages 102-137, incorporated herein by reference.

Figure 7A:
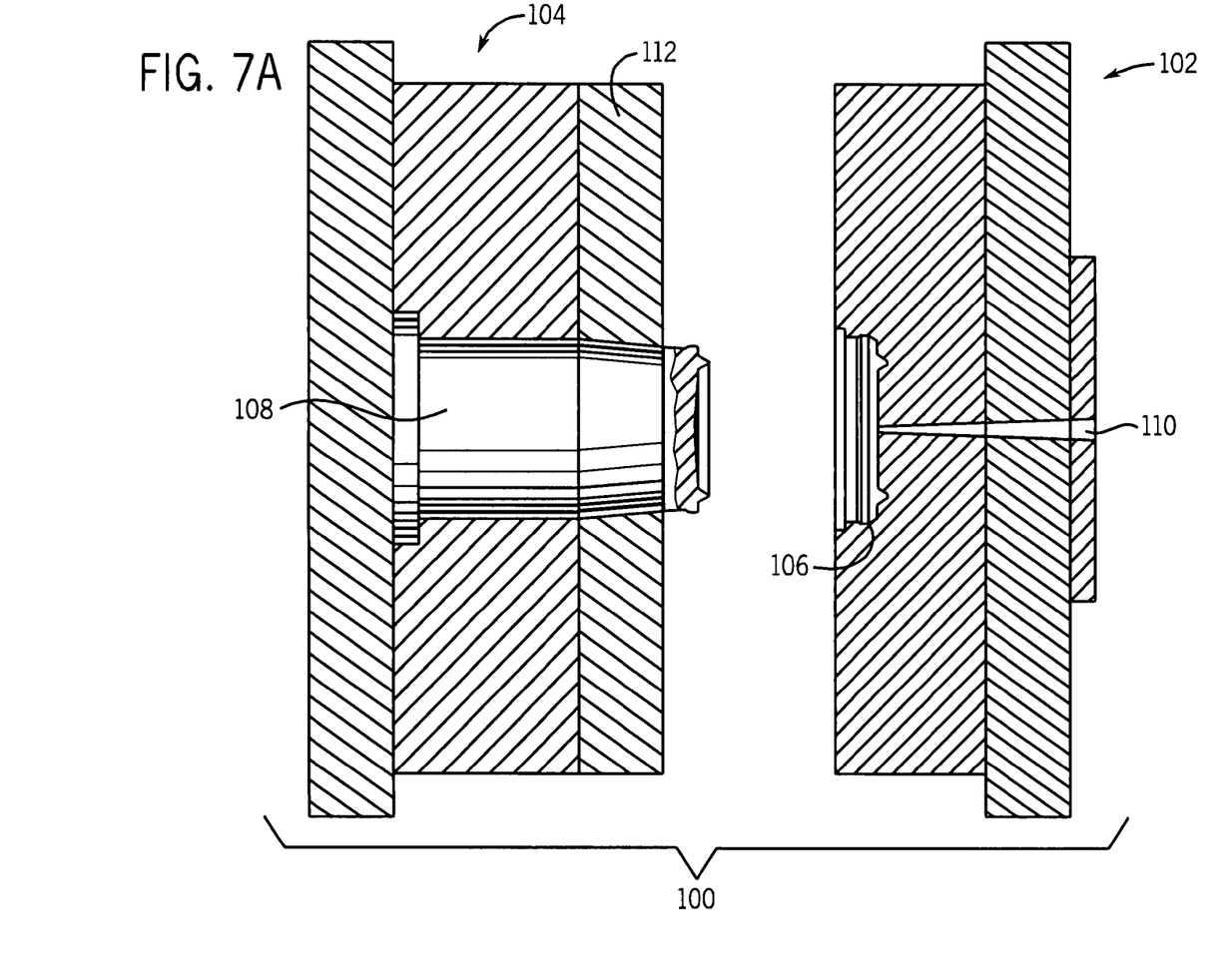
FIGS. 7A through 7E are a series of schematic diagrams illustrating a method suitable for making the closure of this invention.
Figure 7B:
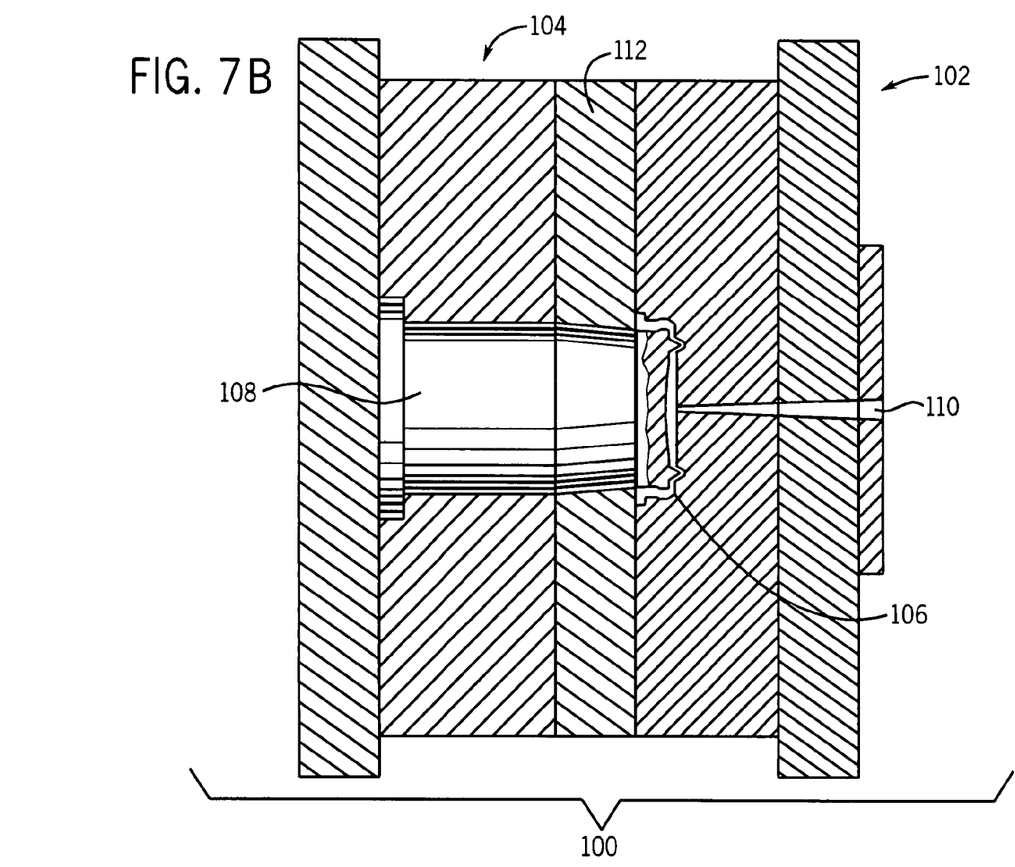

Turning now to FIGS. 7A through 7E, inclusive, FIG. 7A illustrates a side view in elevation of one system for preparing the closure 10 of this invention. An injection molding unit 100 comprises a stationary mold half 102 and a movable mold half 104. The stationary mold half 102 includes a mold cavity 106 for receiving the polymeric material for forming the closure 10. The movable mold half 104 comprises a mold core a mold core 108 for providing the shape of the closure 10. The stationary mold half has an injection port 110, where molten polymeric material is introduced to the molding unit 100. The movable mold half 104 has an ejector 112 for pushing a finished closure 10 off the mold core 108. In FIG. 7A, the injection molding unit 100 is shown with the mold cavity 106 being separated from the mold core 108. In FIG. 7B, the injection molding unit 100 is shown as being closed. The other parts of the injection molding unit 100 are well known to one of ordinary skill in the art and are described, for example, in *Encyclopedia of Polymer Science and Engineering*, 2nd Edition, Vol. 8, John Wiley & Sons, Inc. (1987), pages 102-137, previously incorporated herein by reference.

Figure 7C:
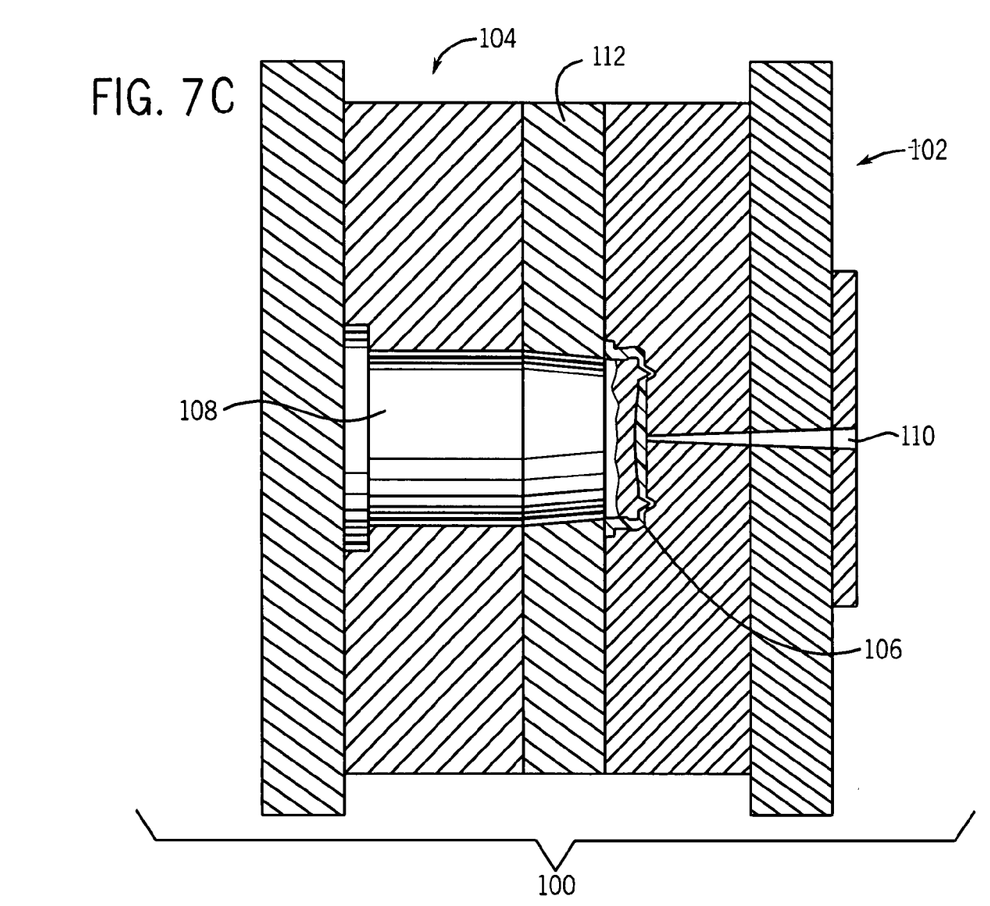

During the molding cycle, the polymeric material for forming the closure 10 is introduced into the assembly formed by the mold core 108 and the mold cavity 106. Introduction of the polymeric material is shown in FIG. 7C. In the case of injection molding, the polymeric material for forming the closure 10 is introduced by an injection step through injection port 110. The mold core 108 and the mold cavity 106 remain in the closed position until the polymeric material for forming the closure 10 has cooled. As the polymeric material for forming the closure 10 is introduced into the assembly comprising the mold cavity 106 and the mold core 108, the heat of the molten polymeric material dissipates.

Figure 7D:
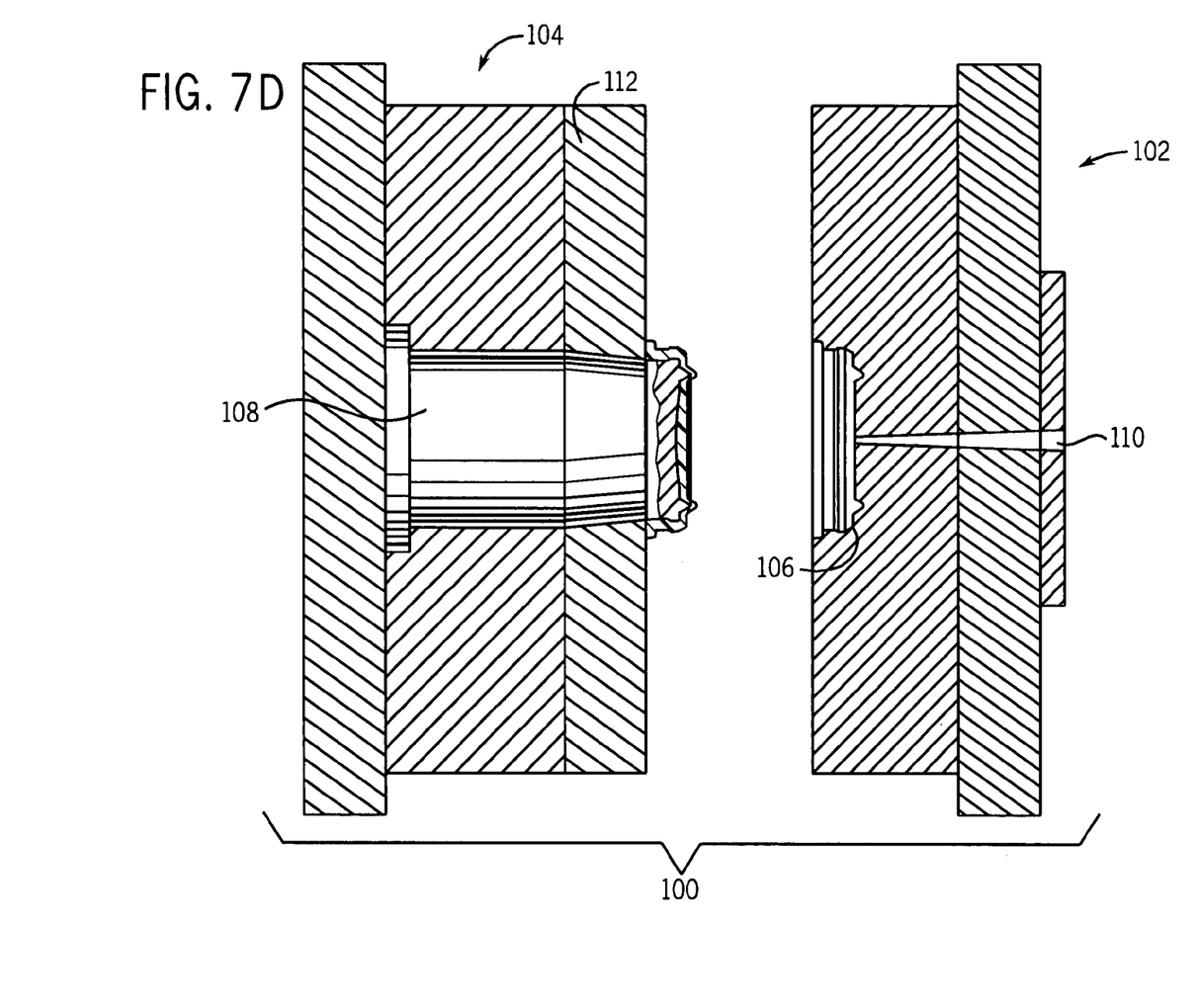

Referring now to FIG. 7D, when the assembly comprising the mold cavity 106 and the mold core 108 is opened, the finished closure 10 remains on the mold core 108.

Figure 7E:
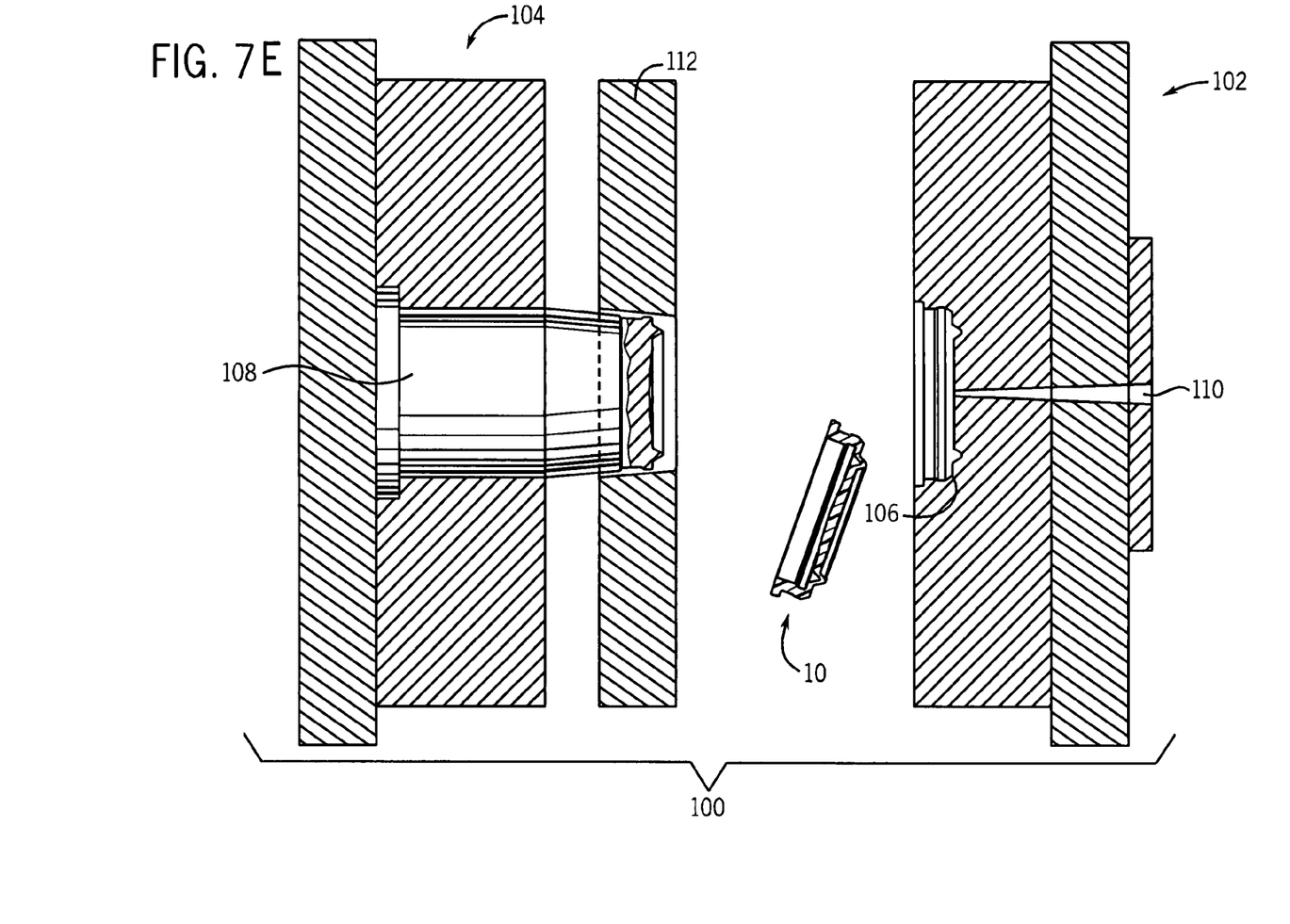

Referring now to FIG. 7E, after the material for forming the closure 10 is cooled and solidified, the ejector 112 in the movable mold half 104 moves in a direction so as to remove the finished closure 10 from the injection molding unit 100. The finished closure 10 can be dropped onto a conveyor (not shown), from which it can be transported into a shipping container (not shown).

The mold cavity 106 and the mold core 108 can be designed to provide the desired structure and shape of the closure 10. The at least one slit 30a, 30b can be formed by means of the molding step for preparing the closure 10. The mold cavity 106 and the mold core 108 can be designed to provide the at least one slit 30a, 30b in the closure 10. All of the design parameters of the injection molding unit 100 can be determined by one of ordinary skill in the art of injection molding without undue experimentation. See, for example, *Encyclopedia of Polymer Science and Engineering*, 2nd Edition, Vol. 8, John Wiley & Sons, Inc. (1987), pages 102-137, previously incorporated herein by reference.

The conditions of the molding cycles of this invention and other steps of the method for preparing the closure of this invention can be selected to provide adequate durations of time for introducing polymeric material into the injection molding unit 100, forming the closure 10, and cooling the formed closure 10. Furthermore, the foregoing conditions and other conditions of the molding process of this invention, e.g., mold release agents, can be determined by one of ordinary skill in the art of injection molding without undue experimentation. See, for example, *Encyclopedia of Polymer Science and Engineering*, 2nd Edition, Vol. 8, John Wiley & Sons, Inc. (1987), pages 102-137, previously incorporated herein by reference The closure 10 and the container 12 of this invention can be used to supply reagents for reactions automatically. The closure 10 and the container 12 of this invention allow capped containers, each containing a reagent, to be placed on an analytical instrument without the necessity of removing the closures manually for obtaining access to the contents of the containers.

The closure 10 and the container 12 of this invention can be used in automated preparation of reagents for reactions. The invention allows one to place a closed container 12 containing a reagent to be placed on an instrument without having to remove the closure 10 for obtaining access to a sample. This invention can be used when large quantities of analyses are performed, e.g., more than 100 samples per day.

For the purposes of this invention, the material that forms the closure 10 is determined by the force that will be exerted by the tip of an aspirating device, e.g., a pipette. The force exerted by the tip of an aspirating device when the aspirating device traverses the slit 30a, 30b of the closure 10 is preferably less than about 0.85 pound force. The force exerted upon the tip of an aspirating device when the aspirating device is being retracted from the container 12 is insufficient to prevent the aspirating device from being retracted from the opening 18 in the closure 10.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A closure for a bottle for liquids, said bottle having a mouth, a rim, and a neck, said neck having an interior surface, said closure and said mouth having substantially the same shape, said closure being of such a size that it fits into the mouth of the bottle and is held snugly in the mouth of the bottle, said closure having a wall and a flange projecting from the wall of the closure, said closure having an exterior surface, said flange abutting said rim of said bottle, said closure comprising a molded polymeric material, said molded polymeric material comprising at least one ultra low-density ethylene copolymer, wherein said closure has at least one slit formed therein, said slit capable of allowing the access of an aspirating device to aspirate the contents of the bottle and removal of the aspirating device from the bottle a plurality of times, said closure capable of controlling evaporation at an average rate of no greater than about 2% of 7 to 7.5 mL deionized water loss over 30 days, assuming evenly distributed usage when exposed to 12° C., 12% relative humidity and 600 feet per minute air flow, wherein frictional force between said exterior surface of said closure and said interior surface of said neck is sufficient to prevent dislodgement of said closure from said bottle when said aspirating device is removed from said bottle.

2. The closure of claim 1, wherein said polymeric material comprises a single ultra low-density ethylene copolymer.

3. The closure of claim 1, wherein said polymeric material comprises a first ultra low-density ethylene copolymer and a second ultra low-density ethylene copolymer.

4. The closure of claim 1, wherein said at least one ultra low-density ethylene copolymer comprises ethylene monomeric units and α-olefin monomeric units.

5. The closure of claim 4, wherein said α-olefin monomeric units comprise from 3 to 20 carbon atoms, inclusive.

6. The closure of claim 4, wherein said α-olefin monomeric units comprise from 3 to 10 carbon atoms, inclusive.

7. The closure of claim 4, wherein said α-olefin monomeric units comprise from 4 to 8 carbon atoms, inclusive.

8. The closure of claim 1, wherein said polymeric material comprises an ultra low-density ethylene copolymer and a propylene polymer.

9. The closure of claim 1, wherein said polymeric material comprises an ultra low-density ethylene copolymer and a lower alkyl acrylate copolymer.

10. The closure of claim 1, wherein said polymeric material comprises an ultra low-density ethylene copolymer and a lower alkyl substituted alkyl acrylate copolymer.

11. The closure of claim 1, wherein said polymeric material comprises an ultra low-density ethylene copolymer and an ethylene vinyl acetate copolymer having a vinyl acetate content of from about 8% to about 40% by weight of the copolymer.

12. The closure of claim 1, wherein said closure comprises a substantially cylindrical body having an opening, said first opening capable of communicating with said mouth of said bottle.

13. The closure of claim 1, wherein said closure has a plurality of slits formed therein.

14. A closure for a bottle for liquids, said bottle having a mouth, a rim, and a neck, said neck having an interior surface, said closure and said mouth having substantially the same shape, said closure being of such a size that it fits into the mouth of the bottle and is held snugly in the mouth of the bottle, said closure having a wall and a flange projecting from the wall of the closure, said closure having an exterior surface, said flange abutting said rim of said bottle, said closure comprising a molded polymeric material, said molded polymeric material having a density of no greater than about 0.915 g/cm$^3$ (as measured by ASTM D-792), a melt index higher than about 3 dg/min (as measured by ASTM D-1238), has a Differential Scanning Calorimeter (DSC) melting peak at 10° C./min of the material of the closure higher than about 60° C., and has a durometer ranging from about 60 to about 100 Shore A (as measured by ASTM D-2240), wherein said closure has at least one slit formed therein, said slit capable of allowing the access of an aspirating device to aspirate the contents of the bottle and removal of the aspirating device from the bottle a plurality of times, said closure capable of controlling evaporation at an average rate of no greater than about 2% of 7 to 7.5 mL deionized water loss over 30 days, assuming evenly distributed usage when exposed to 12° C., 12% relative humidity and 600 feet per minute air flow, wherein frictional force between said exterior surface of said closure and said interior surface of said neck is sufficient to prevent dislodgement of said closure from said bottle when said aspirating device is removed from said bottle.

15. The closure of claim 14, wherein said closure comprises a substantially cylindrical body having an opening, said first opening capable of communicating with said mouth of said bottle.

16. The closure of claim 14, wherein said closure has a plurality of slits formed therein.

17. An assembly comprising a bottle and the closure of claim 1.

18. The assembly of claim 17, wherein said bottle is made of a polymeric material.

19. An assembly comprising a bottle and the closure of claim 14.

20. The assembly of claim 19, wherein said bottle is made of a polymeric material.

* * * * *